United States Patent [19]

Romocki

[11] Patent Number: 5,567,675
[45] Date of Patent: Oct. 22, 1996

[54] APPLICATION OF N,N-DIALKYLAMIDES TO CONTROL THE FORMATION OF EMULSIONS OR SLUDGE DURING DRILLING OR WORKOVER OF PRODUCING OIL WELLS

[75] Inventor: Julian Romocki, Calgary, Canada

[73] Assignees: Buckman Laboratories of Canada, Ltd., Quebec, Canada; Buckman Laboratories Int'l., Inc., Memphis, Tenn.

[21] Appl. No.: 195,675

[22] Filed: Feb. 16, 1994

[51] Int. Cl.⁶ .......................................... C09K 7/00
[52] U.S. Cl. .................... 507/131; 507/261; 507/244; 507/136
[58] Field of Search ........................... 507/244, 261, 507/131, 136

[56] References Cited

U.S. PATENT DOCUMENTS

| | | | |
|---|---|---|---|
| 2,356,205 | 8/1944 | Blair, Jr. et al. | 507/242 |
| 2,356,254 | 8/1944 | Lehmann, Jr. et al. | 507/242 |
| 2,736,641 | 2/1956 | Mattson et al. | 44/418 |
| 2,805,135 | 9/1957 | Bell et al. | 44/419 |
| 3,330,346 | 7/1967 | Jacobs et al. | 166/273 |
| 3,575,855 | 4/1971 | Estes | 507/242 |
| 3,970,148 | 7/1976 | Jones et al. | 44/418 |
| 4,140,640 | 2/1979 | Scherubel | 44/419 |
| 4,233,162 | 11/1980 | Carney | 507/108 |
| 4,595,511 | 6/1986 | Seybold et al. | 507/246 |

FOREIGN PATENT DOCUMENTS

| | | |
|---|---|---|
| 476808 | 2/1973 | Australia . |
| 2177719 | 1/1986 | United Kingdom . |

OTHER PUBLICATIONS

Hawley's Condensed Chemical Dictionary 11th edition, 1987 p. 488.

*Primary Examiner*—Sharon Gibson
*Assistant Examiner*—Valerie Fee
*Attorney, Agent, or Firm*—Finnegan, Henderson, Farabow, Garrett & Dunner, L.L.P.

[57] ABSTRACT

New compositions are disclosed that are useful for the prevention of sludge or emulsions during the drilling or workover of producing oil wells. These compositions are comprised of a N,N-dialkyl amide of a fatty acid, a hydrocarbon solvent for petroleum and a mutual oil/water solvent. Also taught and claimed is a method of preventing such sludge or emulsion formation or of breaking the same after it is formed.

11 Claims, No Drawings

APPLICATION OF N,N-DIALKYLAMIDES TO CONTROL THE FORMATION OF EMULSIONS OR SLUDGE DURING DRILLING OR WORKOVER OF PRODUCING OIL WELLS

This invention relates to a composition useful for prevention of the formation of crude oil/water emulsions or for breaking such emulsions encountered during the drilling or workover of producing oil wells and to a method of preventing the formation of such an emulsion or breaking the same after it is formed.

Primary production of petroleum hydrocarbons from oil bearing formations is usually accomplished by drilling into or through the oil-bearing stratum. Oil then flows into the bore hole, from which it is recovered by pumping to the wellhead.

At times during the preparation and operation of an oil well, it is necessary to submit the well to various "work over" procedures to initiate or to maintain efficient production. In many of these operations, it is found that, under certain conditions, emulsions of water and oil are formed. These oil/water emulsions are a serious problem in that they are of a sufficiently high viscosity that they can substantially reduce the rate of production from a formation. In some cases, the emulsion is so thick as to be immobile and completely block the flow from the formation.

For example, when the well is initially drilled, the surface of the borehole is coated with a filter cake formed by the drilling mud employed during the drilling operation to lubricate the drilling bit and to carry the drillings to the wellhead. Before it is possible for oil to flow from the formation into the borehole, this filter cake must be removed. The filter cake is readily dissolved by 15% HCl containing about 3% HF, based on the weight of HCl. This acid mixture is known in the oil industry as "mud acid" and the treatment is referred to as a "mud acid treatment". Another application of the acid treatment occurs with wells drilled in limestone or sandstone formations. Such formations frequently need to be acid treated to dissolve away mud that is clogging the pores in the stone or to dissolve some of the stone and open up the formation, thus increasing its permeability so that oil can flow to the borehole more readily. In this case, plain 15% HCl is employed as the treating acid.

In these and other applications of the acid treatment, it is found that, if the treating acid contains traces of iron, either as $Fe^{++}$ or $Fe^{+++}$, a thick, highly viscous, non-flowing, emulsified agglomeration comprised of water, various liquid petroleum components and suspended, crosslinked asphaltene and paraffinic components, refered to in the industry as a sludge, is formed. Sludge formation is believed to be attributable to the acid-catalyzed crosslinking and insolubilization of some of the asphaltene and paraffinic components of the crude oil in the presence of the iron contaminant.

Iron can be introduced into the system from several sources. The most likely source is rust or $Fe_3O_4$ from the well casings. Another possible source is iron found naturally in the formation.

The most effective response to the sludge problem at the present time is to attempt to prevent it from occurring by sequestering the iron with expensive chemicals that can prevent free iron from existing in the acid, thus preventing the reaction from taking place.

Another frequently encountered problem, particularly in the opening of new wells, is the formation of emulsions as a result of the drilling mud contacting the crude oil in the newly opened formation. This problem arises when the drilling mud contains one of the water-soluble polymers such as xanthan gum, guar gum or carboxymethyl cellulose, which are widely used in modern mud formulations. Contact between these polymers and some crude oils, irrespective of the presence of an acid environment or the presence of iron, causes the formation of emulsions similar to the sludge described above. These emulsions cause plugging of the oil-bearing formation in much the same way as does the sludge.

In accordance with this invention, there is provided a novel composition useful for prevention of the formation of crude oil/water emulsions or for breaking such emulsions encountered during the drilling or workover of producing oil wells. The novel composition of this invention comprises a solution of, by volume, about 85 to 99.5%, (preferably 93 to 97%, and most preferably 95%), of at least one liquid aromatic hydrocarbon solvent for petroleum, about 0.4 to 8%, (preferably 1 to 5%, and most preferably 3%), of at least one organic compound that is a mutual solvent for water and petroleum and about 0.1 to 7%, (preferably 1 to 5%, and most preferably 3%), of at least one N,N-dialkyl amide of a fatty acid having the formula

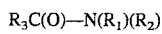

wherein $R_1$ is a substituted or unsubstituted $C_1$–$C_6$ alkyl group; $R_2$ is a substituted or unsubstituted $C_1$–$C_6$ alkyl group; and $R_3C(O)$— is a substituted or unsubstituted fatty acid residue of about 8 to 22 carbon atoms.

Another aspect of the invention contemplates a process for preventing sludge formation during acid treatment of an oil bearing formation or for breaking and dispersing sludge after it is formed in an oil bearing formation as a result of the acid treatment, by treating the oil bearing formation with an effective amount of the novel composition.

Yet another aspect of the invention contemplates the prevention of emulsion formation resulting from the contact of polymer-containing drilling mud with crude oil or the breaking of such an emulsion by treating the oil bearing formation with an effective amount of the novel composition.

The N,N-dialkyl amides of fatty acids useful in the compositions and methods of this invention are known compounds having the formula

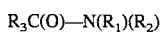

wherein $R_1$ is a substituted or unsubstituted $C_1$–$C_6$ alkyl group; $R_2$ is a substituted or unsubstituted $C_1$–$C_6$ alkyl group; and $R_3C(O)$— is a substituted or unsubstituted fatty acid residue of about 8 to 22 carbon atoms. The dialkyl components of the compounds can be the same or different and are preferably 1 to 3 carbon alkyl groups, and more preferably are methyl.

Although the dialkylamides of any carboxylic acid having 8 to 22 carbon atoms can be used, it is preferred to use those based on fatty acids having 18 carbon atoms such as stearic, oleic, linoleic, linolenic and ricinolenic acid. If a neat dialkyl amide is to be used, the preferred amide is N,N-dimethyl oleamide.

The fatty acid residue, $R_3C(O)$—, of the dialkyl amide can also be a saturated or unsaturated, substituted or unsubstituted residue of a fatty acid that occurs in a vegetable oil rich in $C_{18}$ acids. The vegetable oil can be selected from tall oil, palm oil, soybean oil, cottonseed oil, coconut oil, corn oil, peanut oil, canola oil, safflower oil, sunflower oil, babassu oil, castor oil, linseed oil, olive oil, and tung oil. In a preferred embodiment, the vegetable oil is selected from tall oil, palm oil, and soybean oil.

Formulations of N,N-dialkyl amides containing common additives such as surfactants, emulsifiers or dispersants can also be used in the compositions and processes of this invention. A preferred formulation of a N,N-dialkyl amide is a mixture of about 90.1 wt. % N,N-dialkyl amide of tall oil fatty acid and 9.9 wt. % ethoxylated dodecylphenol (SPI 2400, sold by Buckman Laboratories of Canada, Ltd., Vaudreuil, Quebec, Canada).

Any liquid aromatic hydrocarbon or mixture of aromatic hydrocarbons containing preferably at least 95% aromatic fraction can be employed in the compositions of this invention. Preferred aromatic hydrocarbons include, e.g. benzene, toluene, xylene, and trimethyl benzene or mixtures thereof. The preferred aromatic component of the compositions according to the invention is xylene. A good source of xylene is a product sold by Shell Chemical Company under the trade name Shell Heavy Reformate. This material is comprised of about 98 to 99% xylene.

Any compound conventionally employed in the oil industry as a water/oil mutual solvent can be used in the compositions according to this invention. Typical water/oil mutual solvents include, e.g., monoalkyl or dialkyl ethers of alkylene diols such as, e.g., ethylene glycol monobutyl ether, ethylene glycol monomethyl ether, ethylene glycol mono-t-butyl ether, ethylene glycol monoethyl ether, ethylene glycol monopropyl ether, ethylene glycol monohexyl ether, ethylene glycol dimethyl ether or propylene glycol mono-t-butyl ether. A particularly preferred solvent is ethylene glycol monobutyl ether.

In most cases where a borehole is to be treated according to the invention, the operation is carried out in two steps. Thus, the filter cake stripping operation is preferably carried out first with mud acid using techniques and procedures well known to the oil industry. If, in the course of this operation, the mud acid becomes contaminated with iron, sludge will form at the interface of the mud acid and the oil-bearing formation. In such a case, the composition according to the invention is charged to the borehole following filter cake removal to remove the sludge by breaking it and dispersing its components.

In other cases, an emulsion may have formed, irrespective of the presence of iron, due to the use of a mud based on a water soluble polymer such as xanthan gum, guar gum or carboxymethyl cellulose. This emulsion, which can also reduce, or even prevent, the flow of crude oil from the formation, can be readily broken by charging an effective amount of a composition according to this invention to the formation.

Another operation where acid treatment is commonly practiced is opening up of sandstone or limestone formations to improve their permeability and drainage characteristics. In this operation, the acid employed is normally plain HCl, unmixed with HF. The same sludge formation problem is encountered in this operation, in most cases, as the same sources of iron contamination are present. Here, however, the formation is usually sufficiently open and porous to permit the composition of the invention to be pumped into the formation prior to the introduction of the treating acid. Thus, when the treating acid enters into the formation, it pushes the dialkyl amide/solvent composition of the invention into the formation ahead of it. The acid then contacts the petroleum in the formation only in the presence of the dialkyl amide/solvent composition and sludge formation is prevented.

In drilling operations in which a drilling mud containing a crosslinked water soluble polymer is employed, an oil, water, polymer emulsion is frequently formed. This emulsion can be prevented by using the composition of this invention. In this case, following the removal of the filter cake, the inventive composition is pushed into the formation to contact the emulsion. As contact is made between the composition and the emulsion, the emulsion breaks and the individual components of the emulsion readily flow to the borehole.

Another potential source of emulsion is encountered during KCl fracturing of a formation. In this operation, a solution of KCl in water, lightly gelled with a water soluble polymer is employed to carry sand into the formation as a proppant. When the oil in the formation contacts the KCl, an emulsion of the crude oil and the KCl/water solution can be formed. These emulsions can be broken by the compositions of the invention by contacting the emulsion with the composition. The method of operation is similar to that employed to break emulsions formed by the contact of the oil and the water soluble polymers.

An effective amount of the composition to prevent emulsion or sludge formation or to break and disperse an emulsion or sludge after it is formed depends on the formation being treated, how widespread is the damage, i.e., the emulsion or sludge formation, the type of well, the quality of the oil and other factors peculiar to individual wells. Thus, the effective amount for a specific well is determined on a case-by-case basis.

The invention will be exemplified by the following examples, which are not intended to be limiting except as required by the claims set forth below.

EXAMPLE 1

A series of crude oil specimens from six (6) formations in various parts of the world were treated to demonstrate both the preventive effect and the remedial effect of treatment with the composition according to the invention. Four of the crude oil specimens were taken from formations in Canada, one from Algeria, and one from Russia.

To each crude oil specimen, in a clear container, was added an equal volume of 15% HCl containing 8000 ppm of ferric chloride. In each case, a thick sludge formed almost immediately, filling the entire occupied space within the container with a thick, black, single phase stable sludge. Each of these sludges was treated with 4 times its weight of a composition according to this invention made up of 85% by volume Shell Heavy Reformate, and 15% by volume of a concentrate consisting of, by volume, 2% N,N-dimethyl amide of tall oil fatty acids, 3% ethylene glycol monobutyl ether and 95% aromatic solvent, principally toluene. The thus treated solutions were heated to 50° C. and held stationary at that temperature for 4 hours. At the end of the 4 hour period, they were visually examined for phase behaviour. In each case, it was observed that the sludge had been broken and the material in the container had separated into two distinct phases. The upper phase was the original fluid crude oil, free of sludge; the lower phase was a clear water phase.

To the second series of containers was added, first, in an amount equal to 4 times the weight of the crude oil therein, the composition of this invention used with the first series of containers. The mixture was heated to 50° C. and allowed to stand at that temperature for 4 hours. The solution was then mixed with an equal weight of the 15% HCl containing iron. No sludge was observed in these containers, even after standing overnight, i.e., sludge formation was prevented.

EXAMPLE 2

An oil/water emulsion recovered from a horizontally drilled well in central Alberta, Canada was used to demonstrate the breaking of an emulsion. The emulsion in this case resulted from the use of a drilling mud containing a water soluble xanthan gum, i.e. Kelzan XCD, a product of Kelco Corporation, San Diego, Calif. This emulsion had a viscosity of 1546 mPa at 20° C., exhibiting very poor flow characteristics.

Two 50 ml samples of the emulsion were placed in small beakers. To the first sample was added 50 ml of a mixture consisting of, by volume, about 2% N,N-dimethyl amide of tall oil fatty acids, 3% ethylene glycol dimethyl ether and 95% toluene. To the other sample was added 50 ml of toluene.

Both samples were allowed to stand at 20° C. for four hours. At the end of the four hours, the first sample, treated according to the invention, exhibited a clear separation into oil and water layers. The viscosity of the fluid was 1.66 mPa. The other sample, treated with neat toluene, exhibited no clear separation into oil and water layers, although the viscosity of the fluid was 1.75 mPa.

What is claimed is:

1. A composition useful for prevention of the formation of crude oil/water emulsions or for breaking such emulsions encountered during the drilling or workover of producing oil wells, which composition comprises a solution of, by volume, about 85 to 99.5% of at least one liquid aromatic hydrocarbon solvent for petroleum about 0.4 to 8% of at least one organic compound that is a mutual solvent for water and petroleum and about 0.1 to 7% of at least one N,N-dialkyl amide of a fatty acid having the formula $$R_3C(O)-N(R_1)(R_2)$$

wherein $R_1$ is a $C_1$–$C_6$ alkyl group; $R_2$ is a $C_1$–$C_6$ alkyl group; and $R_3C(O)$— is a fatty acid residue of about 8 to 22 carbon atoms.

2. The composition of claim 1 wherein the organic compound that is a mutual solvent for water and petroleum is a monoalkyl or dialkyl ether of an alkylene glycol.

3. The composition of claim 2 wherein the fatty acid component of the N,N-dialkyl amide is a $C_{18}$ fatty acid.

4. The composition of claim 3 wherein the N,N-dialkyl amide is the N,N-dimethyl amide of a $C_{18}$ fatty acid.

5. The composition of claim 2 wherein the fatty acid component of the N,N-dialkyl amide is tall oil fatty acids.

6. The composition of claim 5 wherein the N,N-dialkyl amide is the N,N-dimethyl amide of tall oil fatty acids.

7. The composition of claim 4 wherein the organic compound that is a mutual solvent for water and petroleum is ethylene glycol mono butyl ether.

8. The composition of claim 6 wherein the organic compound that is a mutual solvent for water and petroleum is ethylene glycol mono butyl ether.

9. A solution useful for prevention of crude oil/water emulsions or for breaking such emulsions encountered during the drilling or workover of producing oil wells comprising about 0.4 to 8% of at least one organic compound that is a mutual solvent for water and petroleum; and about 0.1 to 7% of at least one N,N-dialkyl amide of a fatty acid having the formula $$R_3C(O)-N(R_1)(R_2)$$

wherein $R_1$ is a $C_1$–$C_6$ alkyl group, $R_2$ is a $C_1$–$C_6$ alkyl group, and $R_3C(O)$— is a fatty acid residue of about 8 to 22 carbon atoms;

in at least one liquid aromatic hydrocarbon solvent.

10. The solution of claim 9, wherein said organic compound is ethylene glycol monobutyl ether, said N,N-dialkylamide is N,N-dimethyl amide of tall oil, and said solvent is toluene.

11. The solution of claim 10, wherein said solution comprises 3% by volume of ethylene glycol monobutyl ether as said organic compound and 2% by volume of N,N-dialkylamide is N,N-dimethyl amide of tall oil as said N,N-dialkylamide, and said solvent is toluene.

* * * * *